US008566212B2

(12) United States Patent
Lutnick et al.

(10) Patent No.: US 8,566,212 B2
(45) Date of Patent: Oct. 22, 2013

(54) ELECTRONIC SYSTEMS AND METHODS FOR PROVIDING A TRADING INTERFACE WITH ADVANCED FEATURES

(75) Inventors: Howard W Lutnick, New York, NY (US); Joseph Noviello, New York, NY (US); Michael Sweeting, Aldershot (GB); Lee Amaitis, London (GB); Jim Johnson, London (GB)

(73) Assignee: BGC Partners, Inc., New York, NY (US)

( * ) Notice: Subject to any disclaimer, the term of this patent is extended or adjusted under 35 U.S.C. 154(b) by 2015 days.

(21) Appl. No.: 10/699,859

(22) Filed: Oct. 31, 2003

(65) Prior Publication Data

US 2004/0158519 A1 Aug. 12, 2004

Related U.S. Application Data

(60) Provisional application No. 60/423,618, filed on Oct. 31, 2002.

(51) Int. Cl.
*G06Q 40/00* (2006.01)

(52) U.S. Cl.
USPC .......................................................... 705/37

(58) Field of Classification Search
USPC ..................................... 705/36 R, 37, 38, 39
See application file for complete search history.

(56) References Cited

U.S. PATENT DOCUMENTS

| | | | |
|---|---|---|---|
| 2,134,118 A | 10/1938 | Foss | |
| 3,541,526 A | 11/1970 | Levy, et. al. | |
| 3,573,747 A | 4/1971 | Adams et al. | |
| 3,581,072 A | 5/1971 | Nymeyer | |
| 3,656,148 A | 4/1972 | Belcher et al. | |
| D225,858 S | 1/1973 | Kline | D26/5 |
| 3,976,840 A | 8/1976 | Cleveland et al. | |
| 4,141,001 A | 2/1979 | Suzuki et al. | |
| 4,412,287 A | 10/1983 | Braddock, III | |
| 4,551,717 A | 11/1985 | Dreher | |
| 4,674,044 A | 6/1987 | Kalmus et al. | |

(Continued)

FOREIGN PATENT DOCUMENTS

| | | |
|---|---|---|
| AU | 691467 | 5/1998 |
| CA | 2493971 | 6/1998 |

(Continued)

OTHER PUBLICATIONS

Photographs of a Cantor Fitzgerald trading keyboard.

(Continued)

*Primary Examiner* — Hani M Kazimi
*Assistant Examiner* — Hatem M Ali

(57) ABSTRACT

Systems and methods for a trading interface with advanced features are provided. Along with providing the benchmark issue and non-benchmark issues, the trading application may also provide the trader with the ability to obtain trading information (e.g., another quad) for each of the related U.S. Treasury swaps ("T-swaps"), off-the-runs, yield curve T-swaps, and basis. In some embodiments, the trader may be provided with a customized keyboard to navigate through the trading interface. The keyboard preferably includes keys that allow the trader to quickly and efficiently switch between multiple issues in a quad. Using the keyboard, the trader may also be provided with price improvement functionality and direct dealing functionality. In some embodiments, the trading application may simultaneously display a DD ticker along with the trading quadrant that provides the trader with the progression of the direct dealings of the selected issue.

36 Claims, 7 Drawing Sheets

(56) References Cited

U.S. PATENT DOCUMENTS

| | | | |
|---|---|---|---|
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,903,201 A | 2/1990 | Wagner | |
| 4,906,117 A | 3/1990 | Birdwell | |
| D308,693 S | 6/1990 | Sakaguchi et al. | |
| 4,951,196 A | 8/1990 | Jackson | |
| 4,980,826 A | 12/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| D327,057 S | 6/1992 | Gosch | D14/115 |
| 5,136,501 A | 8/1992 | Silverman et al. | |
| 5,150,118 A | 9/1992 | Finkle et al. | |
| 5,168,446 A * | 12/1992 | Wiseman | 705/37 |
| 5,181,809 A | 1/1993 | Martin | |
| 5,193,924 A | 3/1993 | Larson | |
| 5,195,031 A | 3/1993 | Ordish | |
| D335,660 S | 5/1993 | Busch | D14/115 |
| 5,243,331 A | 9/1993 | McCausland et al. | 345/172 |
| 5,253,940 A | 10/1993 | Abecassis | |
| 5,258,908 A | 11/1993 | Hartheimer et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,339,392 A | 8/1994 | Risberg et al. | |
| 5,347,452 A | 9/1994 | Bay, Jr. | |
| 5,361,199 A | 11/1994 | Shoquist et al. | |
| 5,367,298 A | 11/1994 | Axthelm | 341/22 |
| 5,373,055 A | 12/1994 | Ohmae et al. | |
| 5,375,055 A | 12/1994 | Togher et al. | |
| 5,463,547 A | 10/1995 | Markowitz et al. | |
| 5,579,002 A | 11/1996 | Iggulden et al. | |
| 5,615,109 A | 3/1997 | Eder | |
| 5,640,569 A | 6/1997 | Miller et al. | |
| 5,667,319 A | 9/1997 | Satloff | |
| 5,668,358 A | 9/1997 | Wolf et al. | |
| 5,689,652 A | 11/1997 | Lupien et al. | |
| 5,710,889 A | 1/1998 | Clark et al. | |
| 5,715,402 A | 2/1998 | Popolo | |
| 5,717,989 A | 2/1998 | Tozzoli et al. | |
| 5,727,165 A | 3/1998 | Ordish et al. | |
| 5,757,292 A | 5/1998 | Amro et al. | |
| 5,774,880 A | 6/1998 | Ginsberg | |
| 5,787,402 A | 7/1998 | Potter et al. | |
| 5,794,207 A | 8/1998 | Walker et al. | |
| 5,794,219 A | 8/1998 | Brown | |
| 5,802,497 A | 9/1998 | Manasse | |
| 5,826,244 A | 10/1998 | Huberman | |
| 5,832,462 A | 11/1998 | Midorikawa et al. | |
| 5,835,896 A | 11/1998 | Fisher et al. | |
| 5,842,178 A | 11/1998 | Giovannoli | |
| 5,845,261 A | 12/1998 | McAbian | |
| 5,845,266 A | 12/1998 | Lupien | |
| 5,873,071 A | 2/1999 | Ferstenberg et al. | |
| 5,878,139 A | 3/1999 | Rosen | |
| 5,890,138 A | 3/1999 | Godin et al. | |
| 5,905,974 A * | 5/1999 | Fraser et al. | 705/36 R |
| 5,905,975 A | 5/1999 | Ausubel | |
| 5,914,715 A | 6/1999 | Sasaki | |
| 5,915,209 A | 6/1999 | Lawrence | |
| 5,924,082 A | 7/1999 | Silverman et al. | |
| 5,926,801 A | 7/1999 | Matsubara et al. | |
| 5,950,176 A | 9/1999 | Keiser et al. | |
| 5,963,923 A | 10/1999 | Garber | |
| 5,987,419 A | 11/1999 | Hachino et al. | |
| 6,014,627 A | 1/2000 | Togher et al. | |
| 6,016,483 A | 1/2000 | Rickard et al. | |
| 6,029,146 A | 2/2000 | Hawkins et al. | |
| 6,085,168 A | 7/2000 | Mori et al. | |
| 6,098,051 A | 8/2000 | Lupien et al. | |
| 6,119,101 A | 9/2000 | Peckover | |
| 6,131,085 A | 10/2000 | Rossides | |
| 6,134,535 A | 10/2000 | Belzberg | |
| 6,141,653 A | 10/2000 | Conklin et al. | |
| 6,151,588 A | 11/2000 | Tozzoli et al. | |
| 6,195,647 B1 | 2/2001 | Martyn et al. | |
| 6,199,050 B1 | 3/2001 | Alaia et al. | |
| 6,211,880 B1 * | 4/2001 | Impink, Jr. | 345/418 |
| 6,230,146 B1 | 5/2001 | Alaia et al. | |
| 6,230,147 B1 | 5/2001 | Alaia et al. | |
| 6,247,000 B1 | 6/2001 | Hawkins et al. | |
| 6,259,044 B1 | 7/2001 | Paratore et al. | |
| 6,263,321 B1 | 7/2001 | Daughtery, III | |
| 6,272,474 B1 | 8/2001 | Garcia | |
| 6,278,982 B1 | 8/2001 | Korhammer et al. | |
| 6,282,521 B1 | 8/2001 | Howorka | |
| 6,311,178 B1 | 10/2001 | Bi et al. | |
| 6,317,727 B1 | 11/2001 | May | |
| 6,317,728 B1 | 11/2001 | Kane | |
| 6,343,278 B1 | 1/2002 | Jain et al. | |
| 6,363,365 B1 | 3/2002 | Kou | |
| 6,405,180 B2 | 6/2002 | Tilfors et al. | |
| 6,421,653 B1 | 7/2002 | May | |
| 6,434,536 B1 | 8/2002 | Geiger | |
| 6,438,575 B1 | 8/2002 | Khan et al. | |
| 6,477,513 B1 | 11/2002 | Walker et al. | |
| 6,505,174 B1 | 1/2003 | Keiser et al. | |
| 6,510,418 B1 | 1/2003 | Case et al. | |
| 6,519,574 B1 | 2/2003 | Wilton et al. | |
| 6,538,670 B1 | 3/2003 | Kido | |
| 6,560,580 B1 | 5/2003 | Fraser et al. | |
| 6,625,583 B1 * | 9/2003 | Silverman et al. | 705/36 R |
| 6,629,082 B1 | 9/2003 | Hambrecht | |
| D491,944 S | 6/2004 | Lutnick et al. | |
| 6,772,132 B1 | 8/2004 | Kemp, II et al. | |
| D496,663 S | 9/2004 | Lutnick et al. | |
| D497,912 S | 11/2004 | Lutnick et al. | |
| D498,476 S | 11/2004 | Lutnick et al. | |
| 6,823,318 B1 | 11/2004 | Creswell et al. | |
| 6,850,907 B2 | 2/2005 | Lutnick et al. | |
| D502,467 S | 3/2005 | Lutnick et al. | |
| D503,712 S | 4/2005 | Lutnick et al. | |
| D503,713 S | 4/2005 | Lutnick et al. | |
| D503,935 S | 4/2005 | Lutnick et al. | |
| D504,131 S | 4/2005 | Lutnick et al. | |
| 6,903,662 B2 | 6/2005 | Rix et al. | |
| 6,912,126 B2 | 6/2005 | Rudd et al. | |
| 6,963,856 B2 | 11/2005 | Lutnick et al. | |
| 6,965,511 B2 | 11/2005 | Rudd et al. | |
| D516,072 S | 2/2006 | Lutnick et al. | |
| 7,000,181 B2 | 2/2006 | Press | |
| 7,003,488 B2 | 2/2006 | Dunne et al. | |
| 3,249,919 A1 | 5/2006 | Scantlin | |
| 7,076,461 B2 | 7/2006 | Balabon | |
| 7,080,033 B2 | 7/2006 | Wilton et al. | |
| 7,157,651 B2 | 1/2007 | Rix et al. | |
| 7,243,083 B2 | 7/2007 | Burns et al. | |
| 7,389,268 B1 * | 6/2008 | Kemp et al. | 705/39 |
| 7,392,212 B2 | 6/2008 | Hancock et al. | |
| 7,392,214 B1 | 6/2008 | Fraser et al. | |
| 7,392,217 B2 | 6/2008 | Gilbert et al. | |
| 7,400,270 B2 | 7/2008 | Lutnick et al. | |
| 7,496,533 B1 | 2/2009 | Keith | |
| 7,523,064 B2 | 4/2009 | Burns et al. | |
| 7,552,084 B2 | 6/2009 | Fraser et al. | |
| 2001/0003179 A1 | 6/2001 | Martyn et al. | |
| 2001/0032175 A1 | 10/2001 | Holden et al. | |
| 2001/0037279 A1 | 11/2001 | Yeo | |
| 2002/0023037 A1 | 2/2002 | White | |
| 2002/0023042 A1 | 2/2002 | Solomon | |
| 2002/0026321 A1 | 2/2002 | Faris et al. | |
| 2002/0029180 A1 * | 3/2002 | Kirwin et al. | 705/37 |
| 2002/0070915 A1 | 6/2002 | Mazza et al. | |
| 2002/0073014 A1 | 6/2002 | Gilbert | |
| 2002/0082976 A1 | 6/2002 | Howorka | |
| 2002/0091626 A1 | 7/2002 | Johnson et al. | |
| 2002/0107784 A1 | 8/2002 | Hancock et al. | |
| 2002/0128945 A1 | 9/2002 | Moss et al. | |
| 2002/0143690 A1 | 10/2002 | Mahajan et al. | |
| 2002/0154038 A1 | 10/2002 | Houston | |
| 2002/0156716 A1 | 10/2002 | Adatia | |
| 2002/0161690 A1 | 10/2002 | McCarthy et al. | |

(56) References Cited

U.S. PATENT DOCUMENTS

| | | | |
|---|---|---|---|
| 2002/0169703 | A1 | 11/2002 | Lutnick et al. |
| 2002/0169704 | A1 | 11/2002 | Gilbert et al. |
| 2002/0178104 | A1 | 11/2002 | Hausman |
| 2002/0198815 | A1 | 12/2002 | Greifeld et al. |
| 2003/0004862 | A1 | 1/2003 | Lutnick et al. |
| 2003/0009411 | A1 | 1/2003 | Ram et al. |
| 2003/0033239 | A1 | 2/2003 | Gilbert |
| 2003/0050888 | A1 | 3/2003 | Satow et al. |
| 2003/0065613 | A1 | 4/2003 | Smith |
| 2003/0083976 | A1 | 5/2003 | McLister |
| 2003/0097323 | A1 | 5/2003 | Khalfan et al. |
| 2003/0229571 | A1 | 12/2003 | May |
| 2003/0229900 | A1 | 12/2003 | Reisman |
| 2003/0236737 | A1 | 12/2003 | Kemp et al. |
| 2004/0030634 | A1 | 2/2004 | Satow |
| 2004/0034591 | A1 | 2/2004 | Waelbroeck et al. |
| 2004/0044610 | A1 | 3/2004 | Fraser et al. |
| 2004/0059666 | A1 | 3/2004 | Waelbroeck et al. |
| 2004/0117292 | A1 | 6/2004 | Brumfield et al. |
| 2004/0140998 | A1 | 7/2004 | Gravina et al. |
| 2004/0193519 | A1 | 9/2004 | Sweeting et al. |
| 2004/0210504 | A1 | 10/2004 | Rutman |
| 2004/0210511 | A1 | 10/2004 | Waelbroeck et al. |
| 2004/0210512 | A1 | 10/2004 | Fraser et al. |
| 2004/0218963 | A1 | 11/2004 | Van Diepen et al. |
| 2005/0004852 | A1 | 1/2005 | Whitney |
| 2005/0038731 | A1 | 2/2005 | Sweeting et al. |
| 2005/0038732 | A1 | 2/2005 | Sweeting et al. |
| 2005/0055304 | A1 | 3/2005 | Lutnick et al. |
| 2005/0075966 | A1 | 4/2005 | Duka |
| 2005/0119966 | A1 | 6/2005 | Sandholm et al. |
| 2005/0160032 | A1 | 7/2005 | Lutnick et al. |
| 2005/0171895 | A1 | 8/2005 | Howorka et al. |
| 2005/0216393 | A1 | 9/2005 | Lutnick et al. |
| 2005/0222941 | A1 | 10/2005 | Tull, Jr. |
| 2006/0059079 | A1 | 3/2006 | Howorka |
| 2006/0069635 | A1 | 3/2006 | Ram et al. |
| 2006/0080214 | A1 | 4/2006 | Hausman et al. |
| 2006/0086726 | A1 | 4/2006 | Yamamoto et al. |
| 2006/0218072 | A1 | 9/2006 | Noviello |
| 2006/0229967 | A1* | 10/2006 | Sweeting ................ 705/37 |
| 2006/0265304 | A1 | 11/2006 | Brumfield et al. |
| 2006/0265305 | A1 | 11/2006 | Schluetter et al. |
| 2006/0271475 | A1 | 11/2006 | Brumfield et al. |
| 2006/0277136 | A1 | 12/2006 | O'Connor et al. |
| 2007/0100735 | A1 | 5/2007 | Kemp et al. |
| 2007/0150708 | A1 | 6/2007 | Billeci |
| 2007/0168275 | A1 | 7/2007 | Busby et al. |
| 2007/0174162 | A1 | 7/2007 | Lutnick et al. |
| 2007/0226120 | A1 | 9/2007 | Nanjundamoorthy |
| 2007/0244795 | A1 | 10/2007 | Lutnick et al. |
| 2007/0244796 | A1 | 10/2007 | Lutnick et al. |
| 2007/0250438 | A1 | 10/2007 | Fraser et al. |
| 2007/0255642 | A1 | 11/2007 | Keith |
| 2008/0071670 | A1 | 3/2008 | Fraser et al. |
| 2008/0071671 | A1 | 3/2008 | Fraser et al. |
| 2008/0077523 | A1 | 3/2008 | Fraser et al. |
| 2008/0133401 | A1 | 6/2008 | Gilbert |
| 2008/0140558 | A1 | 6/2008 | Reuter et al. |
| 2011/0066536 | A1 | 3/2011 | Milne |

FOREIGN PATENT DOCUMENTS

| | | |
|---|---|---|
| DE | 3413604 A1 | 10/1985 |
| EP | 0412308 | 2/1991 |
| EP | 0416482 | 3/1991 |
| EP | 0512702 | 11/1992 |
| EP | 0733963 B1 | 9/1996 |
| EP | 0828223 A2 | 3/1998 |
| EP | 0993995 B1 | 4/2000 |
| EP | 1006472 | 6/2000 |
| EP | 1416363 | 5/2004 |
| GB | 2256954 A | 12/1992 |
| GB | 2258061 | 1/1993 |
| GB | 2313276 | 11/1997 |
| JP | 358161068 | 9/1983 |
| JP | 62-256164 | 11/1987 |
| JP | 11-282600 | 3/1998 |
| JP | 2003-525480 | 4/2000 |
| JP | 2002-032565 | 7/2000 |
| JP | 2000-214977 | 8/2000 |
| JP | 2001-501333 | 1/2001 |
| JP | 2002-297280 | 10/2002 |
| KR | 1992-700435 | 2/1992 |
| WO | 85/04271 | 9/1985 |
| WO | 87/03115 | 5/1987 |
| WO | WO 93/15467 | 8/1993 |
| WO | WO 95/26005 | 9/1995 |
| WO | WO 96/05563 A1 | 2/1996 |
| WO | WO 96/34356 | 10/1996 |
| WO | WO97/37315 | 10/1997 |
| WO | WO 98/26363 | 6/1998 |
| WO | WO 98/34187 | 8/1998 |
| WO | WO 98/49639 | 11/1998 |
| WO | WO 98/52133 | 11/1998 |
| WO | WO 99/19821 | 4/1999 |
| WO | WO 00/11588 | 3/2000 |
| WO | WO 00/67172 | 4/2000 |
| WO | WO 00/26745 | 5/2000 |
| WO | WO 00/38093 | 6/2000 |
| WO | WO 01/50317 | 7/2001 |
| WO | WO2006108158 | 4/2006 |

OTHER PUBLICATIONS

Photographs of a BrokerTec USA, LLC trading keyboard.

"Hot Keys Now Available," Success Trader Level II—Direct Access Trading, http://web.archive.org/web20020928124458 (printed Feb. 26, 2004).

"NexTrend Releases Next Generation Electronic Direct Access Tradin, EDAT, Technology Plus New and Expanded Market Analysis Features," Business Wire, Oct. 29, 2001, 2 pgs. www.findarticles.com/cf_dls/m0EIN/2001_Oct_29/79515988/p1/article.jhtml. (printed Mar. 2, 2004).

"Neovest Updates Trade Execution," Neovest High Performand Trading Technology, Aug. 31, 2001, http://www.neovest.com/recentarticles/article2001831.html. (printed Mar. 2, 2004).

USPTO Office Action for U.S. Appl. No. 11/080,322, Apr. 16, 2009; 10 pages.

USPTO Office Action for U.S. Appl. No. 10/382,527, May 12, 2009; 8 pages.

MAOI Technologies Announces IIVEeXCHANGE 2.1, PR Newswire, New York, Sep. 14, 1998, p. 1. Retrieved from ProQuest.

U.S. Appl. No. 10/829,119, filed Apr. 20, 2004, Fraser et al.

U.S. Appl. No. 11/328,814, filed Jan. 9, 2006, Lutnick et al.

Gilbert et al., U.S. Appl. No. 10/113,841, Mar. 29, 2002.

Sweeting, U.S. Appl. No. 10/171,009, Jun. 11, 2002.

Sweeting et al., U.S. Appl. No. 10/640,829, Aug. 13, 2003.

Sweeting et al., U.S. Appl. No. 10/641,196, Aug. 13, 2003.

Lutnick et al., U.S. Appl. No. 10/699,859, Oct. 31, 2003.

U.S. PTO Office Action for U.S. Appl. No. 12/051,708 dated Nov. 16, 2011; 9 pages.

EP Office Action for Application No. 05705585.7; Nov. 15, 2011; 5 pages.

USPTO Office. Action for U.S. Appl. No. 10/147,218, Dec. 10, 2007 (4 pages).

USPTO Office Action for U.S. Appl. No. 10/147,218, Jan. 3, 2007 (5 pages).

USPTO Office Action for U.S. Appl. No. 10/715,081, Aug. 10, 2007 (12 pages).

USPTO Office Action for U.S. Appl. No. 10/715,081, Mar. 3, 2008 (16 pages).

USPTO Advisory Action for U.S. Appl. No, 10/715,081, Mar. 28, 2008 (3 pages).

USPTO Office Action for U.S. Appl. No. 10/715,081, Apr. 30. 2008 (16 pages).

USPTO Office Action for U.S. Appl. No, 10/759,957, Aug. 20, 2007 (11 pages).

(56) References Cited

OTHER PUBLICATIONS

USPTO Office Action for U.S. Appl. No, 10/759,957, Feb. 28. 2008 (15 pages).
USPTO Advisory Action for U.S. Appl. No, 10/759,957, Mar. 28. 2008 (3 pages).
USPTO Office Action for U.S. Appl. No. 10/759,957, May 1, 2008 (15 pages).
USPTO Notice of Allowance for U.S. Appl. No. 11/126,781, Aug. 9, 2007 (4 pages).
USPTO Office Action for U.S. Appl. No. 10/699,858, Feb. 25, 2008 (8 pages).
USPTO Office Action for U.S. Appl. No. 11/328,814, Apr. 10, 2009; 9 pages.
USPTO Office Action for U.S. Appl. No. 10/699,858, May 6, 2009; 8 pages.
USPTO Office Action for U.S. Appl. No. 11/621,546, May 5, 2009; 17 pages.
USPTO Office Action for U.S. Appl. No. 10/715,081, Feb. 2, 2009; 22 pages.
USPTO Office Action for U.S. Appl. No. 10/759,957, Feb. 2, 2009; 20 pages.
MAOI Technologies Announces IIVEeXCHANGE 2.1, PR Newswire, New York, Sep. 14, 1998, p.1. Retrieved from ProQuest.
Australian Examiners Report for AU Application No. 2007204680; 5 pages; Dec. 5, 2008.
USPTO Pre-Brief Appeal Conference Decision for U.S. Appl. No. 10/699,858, Dec. 9, 2009 (2 pages).
USPTO Office Action for U.S. Appl. No. 10/699,858, Apr. 12, 2010 (8 pages).
Notice of Allowance for U.S. Appl. No. 10/759,957; Mar. 2, 2010; 4 pages.
Notice of Allowance for U.S. Appl. No. 10/715,081; Mar. 1, 2010; 4 pages.
Futures, "Guide to Computerized Trading 2003", vol. XXXII, No. 8, 2003; pp. 1-5.
U.S. Appl. No. 12/051,708, filed Mar. 19, 2008; 16 pages.
U.S. PTO Office Action for U.S. Appl. No. 12/051,708 dated Apr. 30, 2010; 6 pages.
AU Examiner Report for AU Application No. 2007204680; 4 pages; Aug. 11, 2010.
EP Office Action for Application No. 07710023.8; 6 pages; Jul. 5, 2010.
Notice of Allowance for U.S. Appl. No. 11/328,814; 7 pages; Aug. 11, 2010.
Canadian Office Action for Application No. 2506980 dated Aug. 12, 2010; 2 pages.
Notice of Allowance for Application No. 10/759,957 dated Feb. 3, 2011; 7 pages.
U.S. PTO Office Action for Appl. No. 12/051,708; Jan. 19, 2011; 9 pages.
AU Examiner Report for AU Application No. 2005208492; 3 pages; Feb. 28, 2011.
Notice of Allowance for U.S. Appl. No. 11/621,547 dated Mar. 29, 2011; 7 pages.
Notice of Allowance for U.S. Appl. No. 11/621,547 dated Jul. 9, 2010; 19 pages.
Notice of Allowance for U.S. Appl. No. 11/328,814; 20 pages; Apr. 27, 2011.
AU Examiner Report for AU Application No. 2010214769; 2 pages; Apr. 7, 2011.
Notice of Allowance for U.S. Appl. No. 11/621,546; 10 pages; Mar. 29, 2011.
USPTO Office Action for U.S. Appl. No. 12/335,951, May 6, 2011; 5 pages.
USPTO Office Action for U.S. Appl. No. 10/699,858, Mar. 21, 2011; 12 pages.
Notice of Allowance for U.S. Appl. No. 10/759,957, Feb. 3, 2011; 6 pages.
Notice of Allowance for U.S. Appl. No. 10/715,081, Feb. 3, 2011; 6 pages.
EP Office Action for Application No. 05252856.9; 9 pages; Aug. 10, 2006.
JP Office Action for JP Application No. 2006-549572; May 18, 2010; 9 pages (includes English Translation).
EP Office Action for Application No. 03256926.1 dated Aug. 16, 2010; 6 pages.
Notice of Allowance for U.S. Appl. No. 10/715,081; Jun. 14, 2011; 9 pages.
Notice of Allowance for U.S. Appl. No. 10/759,957; Jun. 14, 2011; 1 pages.
Notice of Acceptance for AU Application No. 2005208492; Aug. 10, 2011; 2 pages.
AU Second Examination Report for Application No. 2010214769; Jun. 22, 2011; 2 pages.
JP Office Action for JP Application No. 2008-549691; Jul. 19, 2011; 8 pages (including English Translation).
Notice of Allowance for U.S Appl. No. 11/621,546; 11 pages; Oct. 7, 2011.
Notice of Allowance for U.S. Appl. No. 11/328,814; 25 pages; Oct. 18, 2011.
Notice of Allowance for U.S. Appl. No. 10/759,957; Oct. 18, 2011; 16 pages.
Notice of Allowance for U.S. Appl. No. 11/621,547; Oct. 13, 2011; 9 pages.
Notice of Allowance for U.S. Appl. No. 10/715,081; Oct. 21, 2011; 18 pages.
JP Office Action for JP Application No. 2008-549691; Mar. 29, 2012; 5 pages (including English Translation).
EP Extended Search Report for EP Application No. 11192492.4; Jan. 25, 2012; 15 pages.
U.S. Office Action for U.S. Appl. No. 13/412,759; Oct. 25, 2012; 12 pages.
U.S. Office Action for U.S. Appl. No. 12/051,708; Sep. 17, 2012; 32 pages.
CA Examiner's Report for CA Application No. 2,732,007; Jul. 30, 2012; 3 pages.
U.S. Office Action for U.S. Appl. No. 13/372,441; Dec. 21, 2012; 7 pages.
CA Examiner's Report for CA Application No. 2,600,725; Jan. 18, 2012; 5 pages.
U.S. Office Action for U.S. Appl. No. 13/399,583; Nov. 26, 2012; 6 pages.

* cited by examiner

ELECTRONIC SYSTEMS AND METHODS FOR PROVIDING A TRADING INTERFACE WITH ADVANCED FEATURES

CROSS-REFERENCE TO RELATED APPLICATION

This application claims the benefit of U.S. provisional application No. 60/423,618, filed Oct. 31, 2002, which is hereby incorporated by reference herein in its entirety.

BACKGROUND OF THE INVENTION

This invention relates to trading application program interfaces. More particularly, this invention relates to a trading interface having advanced features.

Electronically based trading systems have gained widespread popularity in recent years. Such trading systems are frequently used for trading items ranging from financial instruments (such as stocks, bonds, currency, futures contracts, etc.) to household goods (such as old records, antiques, wines, etc.). In many of these trading systems, bid/offer-hit/take processes are used to negotiate a sale of a given item. In connection with such processes, bids and/or offers for items are entered into a trading system and a hit or take is submitted in response to a bid or an offer, respectively, to agree to a sale.

Today, these trading systems are being developed with advanced processing circuitry and sufficient memory to support new types of software applications not previously envisioned. A challenge created by the new types of software applications is the ability to offer advanced features consistent with users' expectations of a trading interface environment.

Many implementations of electronic trading, while generally accurate, lack in desired speed mainly because traders are forced to use both a standard keyboard and a mouse to execute a trade. This dual process causes much delay for traders because the traders must follow several steps prior to executing a trade. For example, many traders using typical trading systems are required to click on an issue of choice, click on a buy or a sell button, and use the keyboard to enter a price and size for the trade.

The benefit of using a keyboard to execute a trade is that a trader may execute a trade with a great deal more speed than with a mouse. Specifically, with a keyboard, the trader may use all ten fingers, while with a mouse the trader may use two fingers at most.

Despite the drawbacks associated with using a mouse, many traders continue to use a mouse because it is considered easy to use, and thus traders feel that they are less likely to make unwarranted trading mistakes with a mouse. Because trading professionals frequently have large amounts of money at stake when trading, many professionals prefer to forgo speed and efficiency for peace of mind.

While mouse-based interfaces have existed for years, these interfaces have put traders using them at a disadvantage when competing with full-time keyboard traders. One reason the existing mouse-based interfaces place those traders at a disadvantage is that those traders are forced to physically move a mouse pointer from an indicator for a desired instrument, that is at some given point on a trading screen, to some other point on the screen where bidding/offering and buying/selling commands can be entered. This approach is very time-consuming and additionally distracts traders from focusing on market movements and other trades while they attempt to execute their trades.

Furthermore, traders may be interested in Treasuries other than the most recently issued Treasuries (i.e., the benchmark issue). The most recently issued Treasuries are said to be on-the-run. Other Treasuries are said to be off-the-run (i.e., non-benchmark issues). Because off-the-run Treasuries may lack liquidity, they routinely trade at spreads over comparable on-the-run Treasuries. Consequently, off-the-run Treasuries trade at slightly lower prices and higher yields.

Trading systems vary in the type and scope of features that they provide. Typical trading systems allow traders to trade on a benchmark or a non-benchmark issue by selecting the issue of choice, using a mouse to select a buy or a sell button, and using the keyboard to enter a price and size for the trade. One drawback of these trading systems is that non-benchmark issues are not easily accessible from the related benchmark issue.

In view of the foregoing, it would be desirable to provide enhanced features and applications for a trading interface environment that enables a trader to execute trades on benchmark issues and non-benchmark issues quickly, efficiently, and accurately without the use of a pointing device.

SUMMARY OF THE INVENTION

In accordance with this and other objects of the invention, a trading interface having advanced features is provided. More particularly, in accordance with this invention, the trader can use various trading interfaces to create orders, manipulate orders, cancel orders, cycle through multiple issues, obtain trading information more relevant than limit price stacks (e.g., through different types of quadrants), or efficiently buy or sell items inside or within the spread market.

Traders may use a customized keyboard to navigate through the trading interface. The keyboard preferably includes issue keys that are pre-programmed to reflect the issues present in each trading quadrant, or "quad," where key trading indicators are displayed. Using the issue keys on the keyboard, the trader may direct the trading application to quickly and efficiently switch between multiple issues in a quad (e.g., the benchmark issue and non-benchmark issues).

Using the keyboard, the trader may also be provided with price improvement functionality. The keyboard preferably includes a price improvement ("PI") key. If desired, the PI key may be a BEST PI key. Submitting an order with a BEST PI level by, for example, pressing the PI key, may automatically allow the order to jump in front of other prices in the market, including other price improved prices.

The trader may also be provided with direct dealing or request for quote functionality. More particularly, the keyboard preferably includes a direct dealing ("DD") key. Using the DD key along with other keys on the keyboard, the trader may perform such functions as request a quote, respond with a price, cancel a response, amend a response, or accept a response. In some embodiments, the trading application may simultaneously display a DD ticker along with the trading quadrant that provides the trader with the progression of the direct dealings of the selected issue.

Trading interfaces may also be provided. In response to initiating the trading application, the trading application may display the four benchmark U.S. Treasury bonds in a four quad layout. Each quad provides the trader with trading information. Each quad may also include non-benchmark issues that may be selected, for example, in response to a trader pressing one of the issue keys on the keyboard. The trading application may also provide the trader with the ability to obtain trading information (e.g., in the form of another quad)_ for each of the related U.S. Treasury swaps ("T-swaps"), off-the-runs, yield curve T-swaps, and basis.

BRIEF DESCRIPTION OF THE DRAWINGS

The above and other objects and advantages of the invention will be apparent upon consideration of the following detailed description, taken in conjunction with accompanying drawings, in which like reference refers to like parts throughout, and in which:

FIGS. 4 and 5 are illustrative interfaces that include trading quadrants for interactive trading that may be generated in accordance with certain embodiments of the present invention;

DETAILED DESCRIPTION OF THE INVENTION

This invention relates to systems and methods for providing a trading interface with advanced features. The following embodiment of the invention relates to the electronic trading of fixed income related instruments—e.g., such as the United States Treasuries, United Kingdom Gilts, European Government Treasuries, and Emerging Market debts, swaps, repos, etc. This invention may also be used for the electronic trading of securities or other financial instruments, such as stocks or currencies, and is not limited only to the trading of fixed income related instruments. Nevertheless, this embodiment does not limit the invention to this particular subject matter. Rather, it is provided for illustration of the invention and not to limit it to a particular commodity or market.

It should also be noted that although the following embodiment of the invention relates to the trading of a single instrument, such as 30 Year U.S. Treasury bonds, this embodiment is not limited only to the trading of a single instrument. Rather, the invention may also be applied to the trading of a basket of instruments. For example, traders may place offers on the net price movements of the current two and five year U.S. Treasury notes.

It should also be noted that the present invention is primarily described herein in terms of a trading application. It will be understood that the trading application may be any suitable, software, hardware, or both configured to implement the features of the present invention. The trading application may be located at a central location (e.g., a central server). In another suitable approach, the trading application may reside among different locations (e.g., a network).

Although the trading application is described herein as being implemented on user computer equipment, this is only illustrative. The trading application may be implemented on any suitable platform (e.g., personal computer, palmtop computer, laptop computer, personal digital assistant, cellular phone, etc.) to provide such features.

Further details of the invention are described below with respect to FIGS. 1-5.

Figure 1:
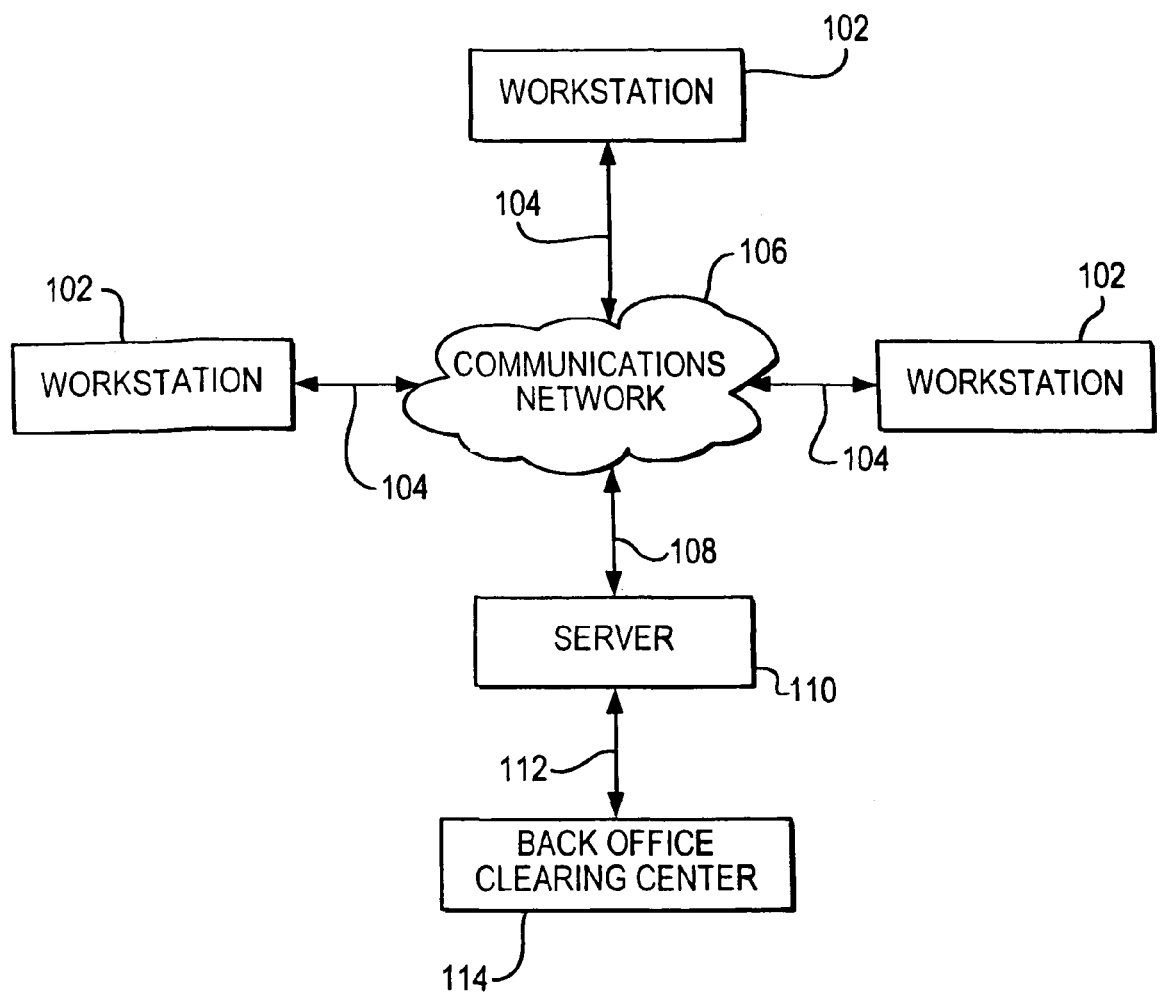
FIG. 1 is a block diagram of a system that may be used to implement processes and functions of certain embodiments of the present invention.

Referring to FIG. 1, exemplary system 100 for implementing the present invention is shown. As illustrated, system 100 may include one or more workstations 102. Workstations 102 may be local or remote, and are connected by one or more communications links 104 to communications network 103 that is linked via communications links 108 to server 110. Server 110 is linked via communications link 112 to back office clearing center 114.

In system 100, server 110 may be any suitable server, processor, computer, or data processing device, or combination of the same. Server 110 may be used to process and settle executed trades, and distribute trade and market information to workstations 102.

Communications network 106 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 may be any communications links suitable for communicating data between workstations 102 and server 108, such as network links, dial-up links, wireless links, hard-wired links, etc.

Workstations 102 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 102 may be used to enter into and proceed with the trades that relate to the present invention, and display trade, benchmark, or spread information to traders of system 100.

Back office clearing center 114 may be any suitable equipment, such as a computer, a laptop computer, a mainframe computer, etc., or any combination of the same, for causing trades to be cleared and/or verifying that trades are cleared. Communications link 112 may be any communications links suitable for communicating data between server 110 and back office clearing center 114, such as network links, dial-up links, wireless links, hard-wired links, etc.

Figure 2:
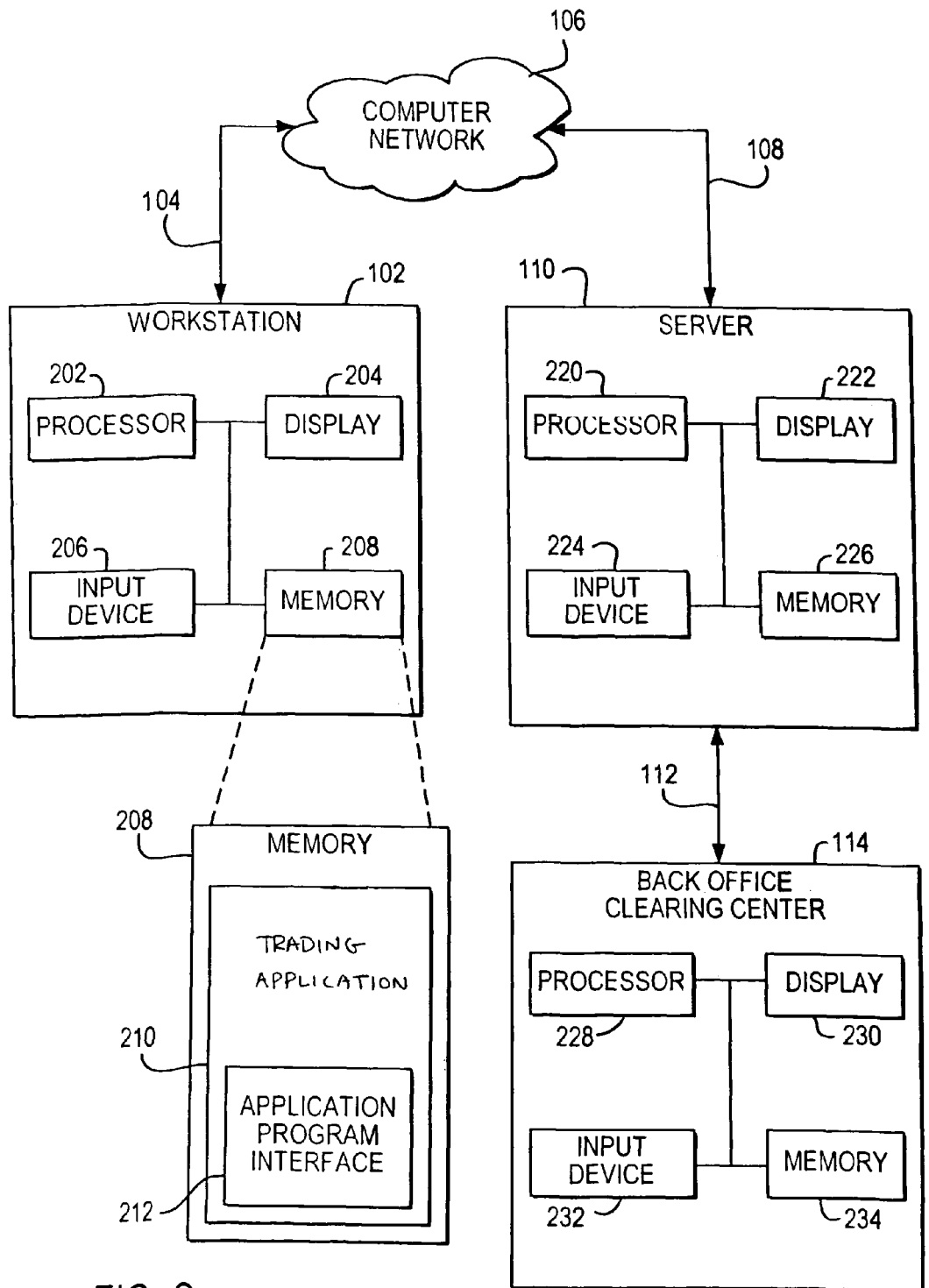
FIG. 2 is a block diagram of a workstation, a server, and a back office clearing center that may be used to implement the processes and functions of certain embodiments of the present invention.

The server and the back office clearing center, and one of the workstations, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 201. Memory 208 also preferably contains a trading application 210 in accordance with the present invention.

As shown in FIG. 2, trading application 210 may include an application program interface 212. Alternatively, as described above, trading application 210 may be resident in the memory of server 110. In such embodiments, the electronic trading system may contain trading application 210 and application program interface 212 as an application that is discrete from the trading application, which also may be included therein. The only distribution to the trader may be a GUI which allows the trader to interact with graphical trading interface application 210 resident at server 110.

Processor 202 may use the workstation program to present on display 204 trade information relating to bids, offers, executed trades, and luxury item information to a trader of workstation 102. Furthermore, input device 206 may be used by the trader to enter such bids and offers, modify them, and to enter into trades involving the futures and/or options contracts.

Server 110 may include processor 220, display 222, input device 224, and memory 226, which may be interconnected. In a preferred embodiment, memory 226 contains a storage device for storing trade information relating to the trades. The storage device further contains a server program for controlling processor 220. Processor 220 uses the server program to transact the purchase and sale of the futures and/or options contracts.

Back office clearing center 114 may include processor 228, display 230, input device 232, and memory 234, which may be interconnected. In a preferred embodiment, memory 234 contains a storage device for storing a clearing program for controlling processor 228. Processor 228 uses the clearing program to clear executed trades. Clearing executed trades may preferably include exchanging currency for a future commitment or a future option.

Input device 206 of workstation 102 may be used by traders in conjunction with display 204 to execute and monitor trades. It should be noted that trading is highly fluid and fast paced. Efficient input systems are important to effectuate the multiple options and to permits these levels of efficiency. Accordingly, input device 206 may include a keyboard with advanced features 300, as illustrated in FIG. 3.

Figure 3:
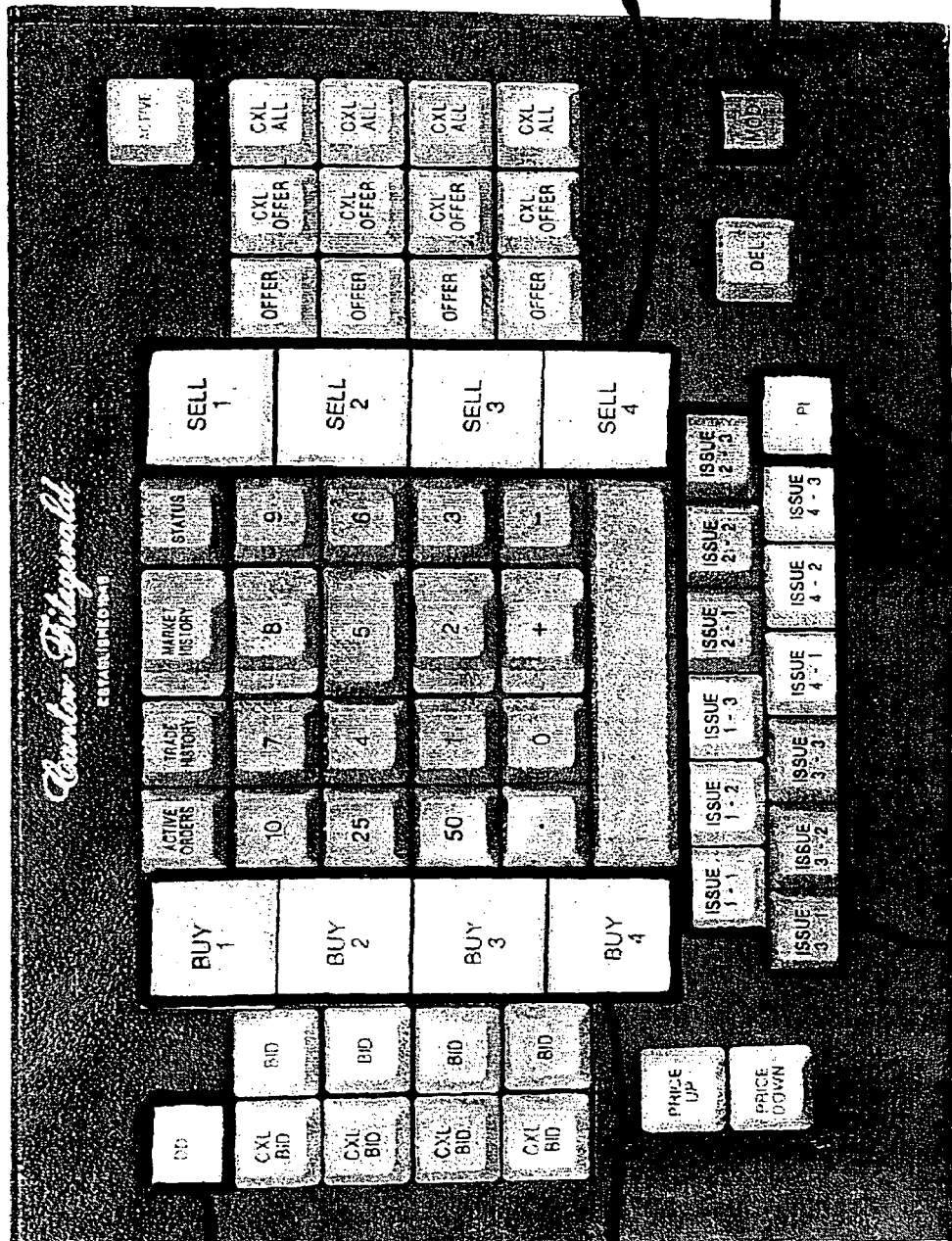
FIG. 3 is an illustrative schematic view of a keyboard that may be used to implement the processes and functions of certain embodiments of the present invention.

FIG. 3 is an illustrative schematic view of a keyboard in some embodiments of the present invention. Keys, such as the lower twelve issue keys 310, on keyboard 300 are preferably color-coded and labeled. In some embodiments, the programmable issue keys may be color-coded to differentiate each group of issue keys. For example, a group of issue keys (e.g., the "issue 1.1" key, the "issue 1.2" key, and the "issue 1.3" key) may be colored gray, while the next group of issue keys (e.g., the "issue 2.1" key, the "issue 2.2" key, and the "issue 2.3" key) may be colored dark gray.

The lower twelve issue keys 310 are preferably pre-programmed to reflect the issues present in each trading quadrant, or "quad," where key trading indicators are displayed. A trader may use keyboard 300 to switch between multiple issues in a quad (e.g., the benchmark issue and non-benchmark issues). An illustrative trading quadrant is shown, for example, in FIG. 4. The four buy keys 315 and the four sell keys 320 may also be pre-programmed to match or complement each issue key. In some embodiments, each key may also be programmed using a MOD function. The MOD function may be implemented by, for example, pressing a function key along with a red MOD key 325.

In some embodiments, keyboard 300 may also include price improvement functionality. Price improvement, in accordance with the present invention, enables one or more traders to improve on an existing market trading price. For example, consider a market in which several buyers and sellers are submitting bids and offers for a selected item at a predetermined price. When one of the traders hits or lifts a bid/offer posted by another trader, thereby activating the active trader's side of the market for that item, the price at which the trader hit or lifted the bid becomes the "touch" price of the market. The touch price is the active market price for a selected item. Once a trade has been initiated, other traders may submit orders that improve on the touch price. When a trader submits a price improved order on a selected item, that trader may "jump in front" of other traders in a buying or selling stack. When an order "jumps in front" of other orders or is put on top of the stack, that order is in a position to be executed (e.g., used to fill an order) first when a buyer decides to buy or a seller decides to sell. A stack lists various order sizes for a particular item, and is typically arranged according to a predefined set of parameters.

As shown in FIG. 3, keyboard 300 includes a PI key 330 that provides the trader with the price improvement functionality. If desired, the PI key may be a BEST price improvement key. Submitting an order with a BEST price improvement level by, for example, pressing PI key 330, may automatically allow the order to jump in front of other prices in market that includes other price improved prices. The BEST price improvement function increases the order price at any suitable increment (e.g., 0.25, 0.50, 0.75, etc.) that is more aggressive than the price currently at the top of the stack. In response to the trader pressing PI key 330 multiple times, the price improvement function may be toggled to increase the order price at a predetermined increment (e.g., 0, 0.25, 0.50, 0.75, etc.).

Systems and methods for providing price improvement in an active trading market are also described, for example, in co-pending, commonly-assigned Sweeting U.S. patent application Ser. No. 10/171,009, filed Jun. 11, 2002, which is hereby incorporated by reference herein in its entirety.

In some embodiments, keyboard 300 may also include direct dealing (hereinafter "DD"), or request for quote functionality. In DD style trading, there are requestors and responders. A requestor may enter a request to deal on a particular item at the midpoint of the spread market, thereby providing an affirmative interest to trade at the midpoint. The requestor may enter a request with a specific midprice buy or sell order, or a requestor may request a midprice order to trade a specified size without indicating an interest to buy or sell. A responder may respond to that request by submitting an order to buy or sell the item at the midprice.

As shown in FIG. 3, keyboard 300 includes a DD key 330 that provides the trader with the direct dealing functionality. Direct dealings pertaining to each tab in the quad (e.g., tabs 426-432 in quad 410 of FIG. 4) may be accessible by, for example, pressing DD key 330. For example, in response to a trader viewing the "off-the-run issues" (by selecting the "off-the-run" tab), the trading application may provide the trader with the direct dealings (or request for quotes) pertaining to the off-the-run issues.

Using DD key 330 and the other keys on keyboard 300, the trader may perform such functions as request a quote, respond with a price, cancel a response, amend a response, or accept a response. For example, to request a quote, the trader may press one of the issue keys 310 and then press DD key 330. The user may be prompted to enter a size. In response to entering a size and pressing one of the buy keys 315 or sell keys 320, the trading application may request a quote based on the entered information. In another example, the trader may direct the trading application to scroll through available direct dealings by pressing DD key 330 multiple times.

Systems and methods for providing a trading interface with a request for quote (RFQ) functionality are also described, for example, in co-pending, commonly-assigned Gilbert et al. U.S. patent application Ser. No. 10/113,841, filed in Mar. 29, 2002, which is hereby incorporated by reference herein in its entirety.

In some embodiments, keyboard 300 may include a VIEW key. In response to a trader pressing the VIEW key, the trading application may provide the trader with available views of the quad. For example, in response to the trader pressing an issue key, the trading application may provide the trader with the associated quad. In response to the trader subsequently pressing the VIEW key, the selected quad may cycle between different views (e.g., a curve quad, a t-swaps quad, an olds quad, etc.). Curves, such as a yield curve, may be used by traders to view the overall movement of interest rates or yields. In some embodiments, the quad may initially display the view that the trader last displayed.

However, any other suitable approach may also be used for displaying the quad. For example, the trading application may display the view that the trader most frequently viewed or the most popular view.

In some embodiments, keyboard 300 may include a STATUS TOGGLE key. In response to a trader pressing the STATUS TOGGLE key, the trading application may provide the trader with the trade history of the item or instrument. In response to the trader pressing the STATUS TOGGLE key multiple times, the trading application may cycle or toggle through different information relating to the item or instrument, such as, for example, the active orders for the item or instrument, the market history, or the status of the item or instrument.

Keyboard 300 also preferably includes a SHIFT key and an ALT key. The SHIFT key may direct the trading application to provide the trader with a snapshot or summary of the limit order stacks for the selected item or instrument. The ALT key may allow the trader to further program other functionality into keyboard 300. For example, a trader may implement other functions by, for example, holding down the ALT key and another key.

In some embodiments, the trading application may retrieve a keyboard mapping file from, for example, the trader's workstation. The trading application may read the keyboard mapping file and assign the keys of keyboard 300 to particular functions and/or macros. In some embodiments, the trading application may allow the trader to edit the keyboard mapping file to customize keyboard 300.

In the foregoing specification, keyboard 300 has been described with reference to specific embodiments. It will be understood that the arrangement of the keys, the color-coding of the keys, the key labels, and the functionality of the keys are illustrative examples. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

As described previously, issue keys 310 are preferably pre-programmed to reflect the issues present in a trading quadrant, or "quad," where key trading indicators are displayed. A trader may use issue keys 310 to direct the trading application to switch between multiple issues in a quad.

Figure 4:
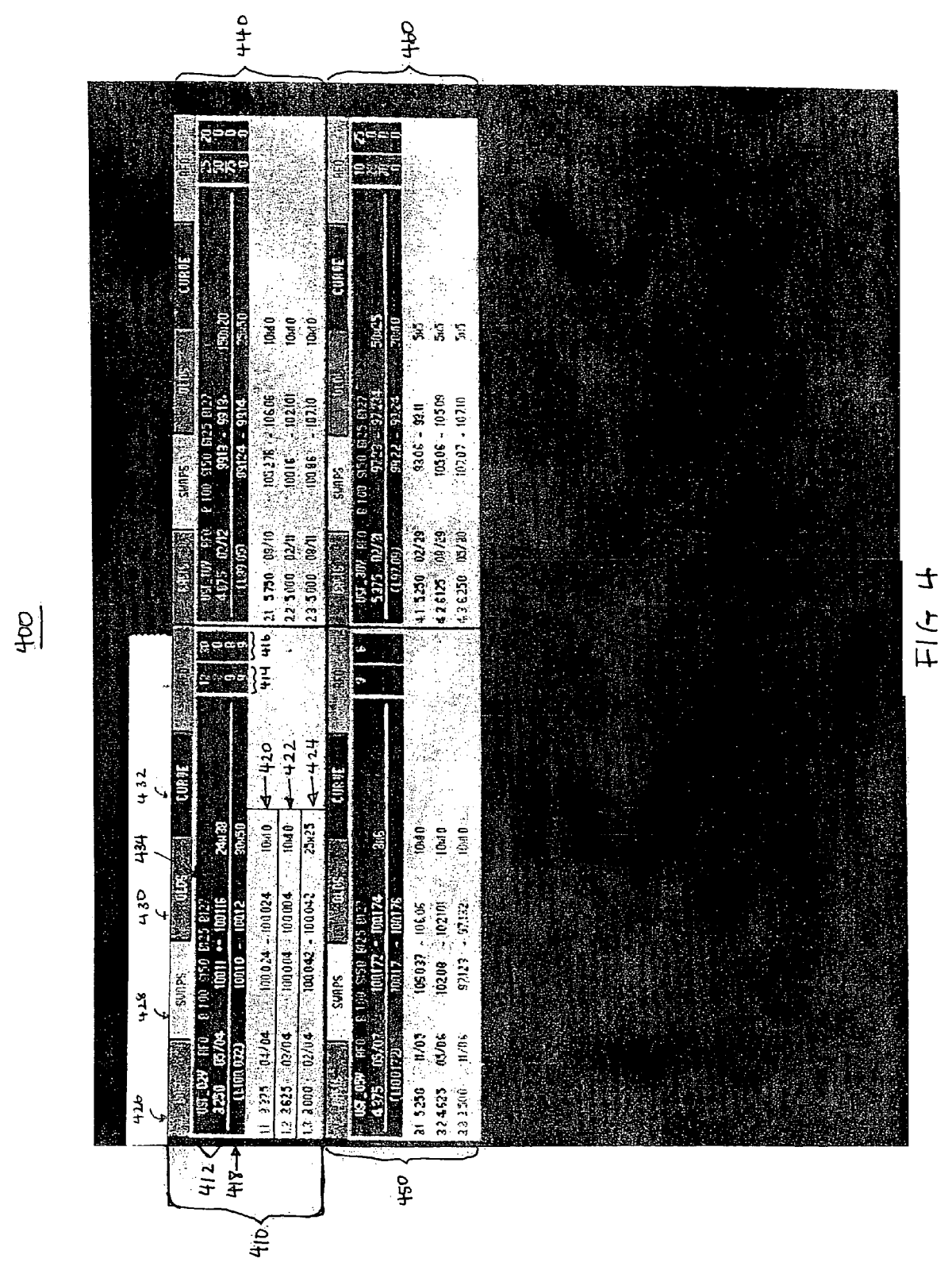
Figure 5:
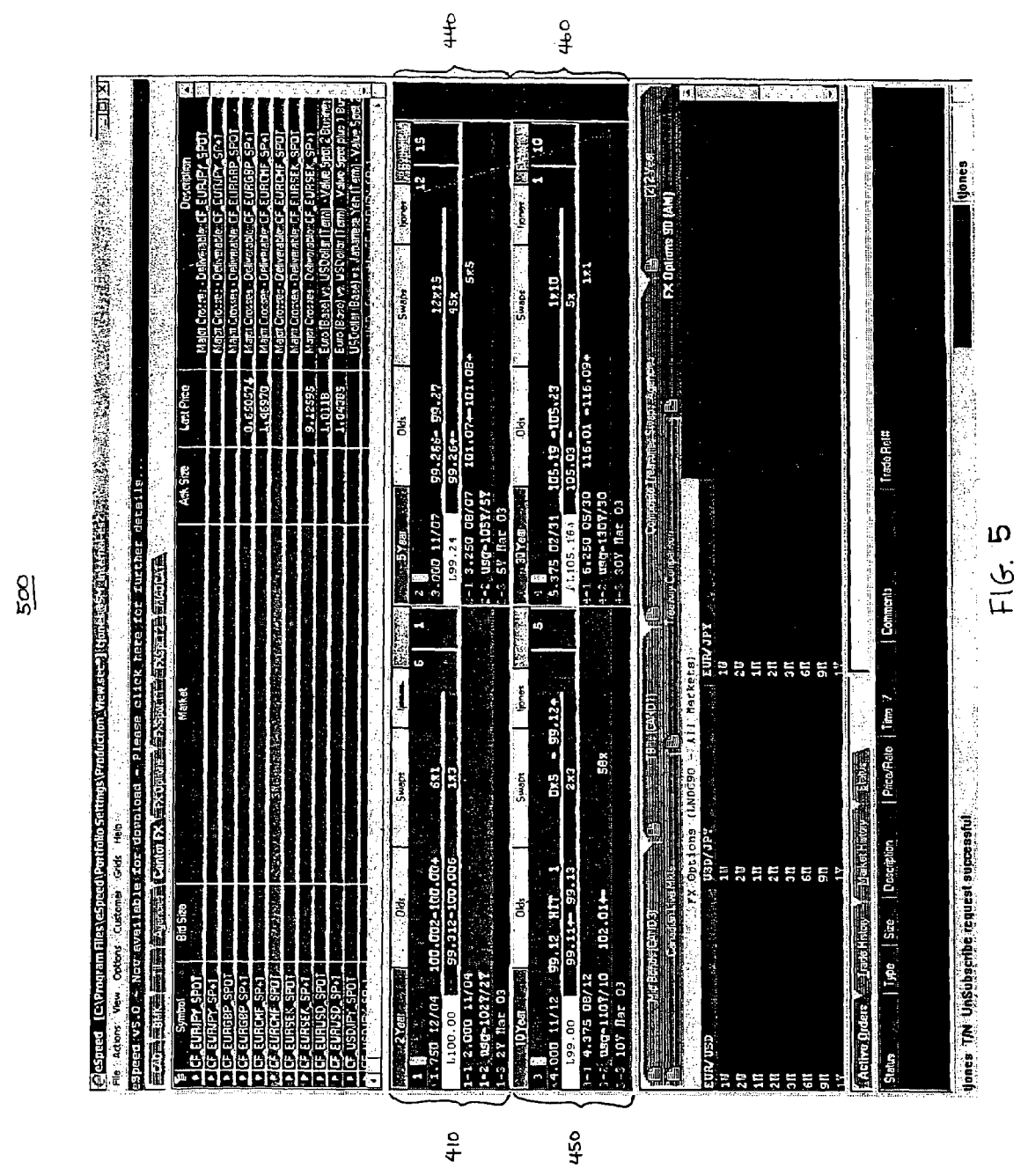

FIGS. 4 and 5 show illustrative interfaces for interactive trading that are adapted for implementing systems and methods according to the present invention. In response to initiating the trading interface, the trading application may display the four benchmark U.S. Treasury bonds in a four quad layout. As shown in FIG. 4, the trading interface has four quads 410, 440, 450, and 460 which provide trading information related to the two year U.S. Treasury note, the five year U.S. Treasury note, the ten year U.S. Treasury note, and the thirty year U.S. Treasury bond, respectively.

Each quad provides the trader with trading information. As shown in the two year U.S. Treasury note quad 410, quad 410 includes a headline 412. Headline 412 is preferably adapted to include the price that should be initially aggressed to start a trade or the actual aggressed trade. In either case, the headline is generally located at the top of the quad. The headline may include the item (e.g., "USG_02Y"), the price, the size, and the last price for the benchmark issue. The benchmark issue (also referred to herein as the "on-the-run issue") is the most recently auctioned Treasury issues for each maturity. Also shown in quad 410 are bid and offer stacks 414 and 416, respectively. Bid and offer stacks 414 and 416 may indicate the size of one or many market participants that are bidding or offering at the current price.

As shown in FIG. 4, under the benchmark issue, the trading application may provide the trader with a T-swaps lock price 418 (e.g., L 100.032) on the benchmark. (T-Swap trading relates to a chosen price movement relationship between two different instruments). Quad 410 may also include any other suitable trading information, such as market depth information, which shows price and size for items that have not yet been traded.

The T-swaps lock price 418 is L 100.032 in FIG. 3. As known in the art, U.S. Treasury bonds are traded at a percentage of a bond's face value. This percentage is typically broken down into 32nds of a point and fractions thereof. The prices shown in FIGS. 4 and 5 represent the whole number portion and the percentage being traded. For example, consider the price "100.032." The number left of the decimal point ("100") is equivalent to the whole number portion of the price and the number right of the decimal point ("032") is equivalent to the fractional portion. More particularly, the first two digits right of the decimal point ("03") represent the number of 32nds and the third digit represents the number of 8ths of a 32nd. In this case, the fraction appended to the whole number portion of the price is $3/32$nd and $2/8$th of a 32nd. Note that some prices may have "+" in the third digit right of the decimal point. The "+" may represent $4/8$ths of a 32nd or half a 32nd, and may be displayed in this instance instead of a "4."

Quad 410 and other quads generally may also include non-benchmark issues 420, 422, and 424 (e.g., issue 1.1, issue 1.2, and issue 1.3) that may be selected in response to the trader, for example, pressing one of the issue keys 310 on keyboard 300.

The trading application may also provide the trader with tabs for each of the related U.S. Treasury Swaps (T-swaps), off-the-runs (i.e., Treasury bonds issued before the most recently issued bond of a particular maturity), yield curve T-swaps, and basis. As shown in FIG. 4, each quad 410, 440, 450, and 460 includes a "Basis" tab 426, a "Swaps" tab 428, an "Olds" tab 430, and a "Curve" tab 432.

In response to the trader selecting "Basis" tab 426, the trading application may provide the trader with a basis quad. The basis quad preferably contains the benchmark issue, "one-old" basis item or instrument, and the cheapest-to-deliver (CTD) bond. When a bond matures, the seller has to deliver the underlying instrument. It is necessary to deliver a bond with the same characteristics. In some embodiments, certain futures contracts may require cash delivery. That is, a requirement of certain futures contracts is that the underlier should not be delivered to the buyer at maturity, and instead the value of the underlier should be paid out. Accordingly, a seller preferably finds the CTD bond from bonds available in the basket of deliverable bonds.

Generally, if the yield for the CTD bond changes by a given amount, the benchmark issue's yield also changes by a similar amount. It should be noted that the CTD bond may change quarterly. In some embodiments, the CTD bond may change intra-quarter.

In response to the trader selecting "Swaps" tab 428, the trading application may provide the trader with a treasury swaps ("T-swaps") quad. The T-swaps quad preferably includes the three most recent benchmark bonds, where the oldest benchmark bond is replaced by the usg+0XY/XY T-swap (e.g., usg+05Y/05Y) when it becomes available. The T-swaps quad may also include the "pick up" and "give up"

indicated yield spreads. The T-swaps quad, similar to the benchmark quad described previously and generally other quads, includes the T-swaps lock price bond and its associated lock price.

In response to the trader selecting "Olds" tab 430, the trading application may provide the trader with an off-the-runs quad. The off-the-run quad preferably includes the three most recent benchmark bonds, where the oldest benchmark bond is replaced by the usg+0XY instrument (e.g., usg+05Y) when it becomes available.

In response to the trader selecting "Curve" tab 432, the trading application may provide the trader with a curve quad. The curve quad preferably includes the yield curve T-swaps relevant to the benchmark selected. Yield curves provide traders with comparisons of the interest rate on instruments of different maturity. For example, if a trader thinks it is riskier to buy a bond with fifteen years until it matures than a bond with five years of life, the trader will demand a higher interest rate (i.e., yield) on the longer-dated bond. If such is the case, the yield curve will slope upwards from the shorter maturities (the left side of the curve) to right. Generally, the yield curve slopes upward because traders demand compensation for the added risk of holding longer-term instruments. Information may be gleaned from changes in the spreads between yields on bonds of different maturities and on different sorts of bonds with the same maturity.

The information contained in each quad is as follows, where the issue listed in the replacement column replaces the previous instrument (e.g., the top

TABLE 1

| Item | OLDS | Replacement | Swaps | Replacement | Curve |
|------|------|-------------|-------|-------------|-------|
| 2Y | usg − 302Y | usg + 02Y | usg − 302Y/2Y | usg + 02Y/2Y | usg__02Y/5Y |
|    | usg − 202Y |           | usg − 202Y/2Y |              | usg__02Y/10Y |
|    | usg − 102Y |           | usg − 102Y/2Y |              | usg__02Y/30Y |
| 5Y | usg − 305Y | usg + 05Y | usg − 305Y/5Y | usg + 05Y/5Y | usg__02Y/5Y |
|    | usg − 205Y |           | usg − 205Y/5Y |              | usg__05Y/10Y |
|    | usg − 105Y |           | usg − 105Y/5Y |              | usg__05Y/30Y |
| 10Y | usg − 310Y | usg + 10Y | usg − 310Y/10Y | usg + 10Y/10Y | usg__02Y/10Y |
|    | usg − 210Y |           | usg − 210Y/10Y |              | usg__05Y/10Y |
|    | usg − 110Y |           | usg − 110Y/10Y |              | usg__10Y/30Y |
| 30Y | usg − 330Y | usg + 30Y | usg − 330Y/30Y | usg + 30Y/30Y | usg__02Y/30Y |
|    | usg − 230Y |           | usg − 230Y/30Y |              | usg__05Y/30Y |
|    | usg − 130Y |           | usg − 130Y/30Y |              | usg__10Y/30Y |

As described previously, the trading application may also provide the trader with direct dealing functionality. The trading application in which each quad operates may determine which DD orders, if any, are matched to each other. In order for DD orders to match, two orders have to be contra or opposite to each other. A buy DD order is contra to a sell DD order.

For example, assume that the requesting midprice DD order is a buy DD order with a size of 100. After the midprice interest is displayed, one or more market participants or traders may submit a midprice DD order (e.g., responding DD orders). If a second midprice DD order is a buy order for 100, that order is queued behind the initial order. Because both the initial and second orders are buy orders, the requesting order is queued first because it was submitted before the second order. If a midprice DD sell order of size 150 is received, the initial buy order is matched with a portion of the sell order and half of the second buy order is used to fill the sell order. As a result, a buy DD order of size 50 is currently available for midprice trading.

Each quad 410, 440, 450, and 460 preferably includes a direct dealing ("DD") ticker 434. DD ticker 434 may include the orientation and size of the order. DD ticker 434 preferably changes its content according to the progression of the direct dealing. Table 2 below shows several examples of ticker content.

TABLE 2

| On request | |
|---|---|
| B100 | when requesting a price on 100 million to buy |
| S100 | when requesting a price on 100 million to sell |
| T100 | when requesting a price on 100 million two-way price |
| M100 | when requesting a bid/offer liquidity spread ("BOLS") that includes a spread value (or a bid value and an offer value that define a spread) —i.e., make me a certain market spread and I will guarantee to trade |
| On response | |
| B100 101.24+ | when the response is a bid for 100 million |
| S100 101.24+ | when the response is an offer (ask) for 100 million |
| T100 101.24+−252 | when the response is a 101.24+ bid, 101.252 offer in 100 million |
| M100 101.24+−/252 | when the (BOLS) response is 101.24+ bid, 101.252 ask in 100 million |

TABLE 2-continued

| On acceptance/rejection. | |
|---|---|
| t100 | you traded 100 million |
| m100 | 100 million were traded, but you missed it |
| c100 | 100 million direct dealing was cancelled |

It should be noted that the direct dealing ticker contains real-time information on the progress of the direct dealing. The real-time information relating to the direct dealing may be displayed using any suitable approach.

Figure 6:
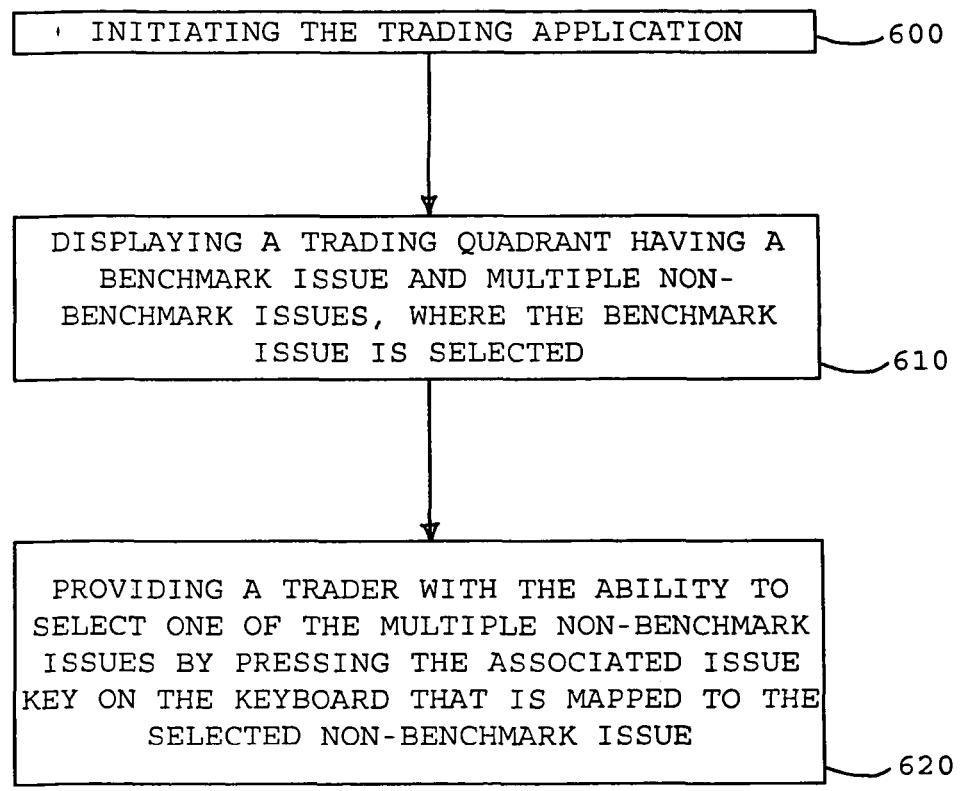
FIG. 6 is a flow diagram of a process that may be used to allow traders to switch between multiple issues in a trading quadrant in accordance with certain embodiments of the present invention.

FIG. 6 is a flow chart of an illustrative method involved in allowing a trader to switch between multiple issues (e.g., issue 1.1 to issue 1.2) in accordance with some embodiments of the present invention. This is a generalized flow chart. It will be understood that the steps shown in FIG. 6 may be performed in any suitable order, some may be deleted, and others added.

At step 600, the trading application may be initiated and may provide the trader with an initial display. The initial display may provide traders with opportunities to log in, or may provide traders with access to other system features. In some embodiments, traders may be required to log in by, for example, entering a user name and a password. In other embodiments, traders may not be required to log in to access the features of the system.

At step 610, the trading application may display a trading quadrant ("quad") that has a benchmark issue and multiple non-benchmark issues. The benchmark issue is currently selected. Along with providing the benchmark issue and non-benchmark issues (e.g., issues 1.1, 1.2, and 1.3), the trading application may also provide the trader with the ability to obtain trading information (e.g., another quad) for each of the related U.S. T-swaps, off-the-runs, yield curve T-swaps, and basis.

At step 620, the trading application may provide the trader with the ability to select one of the multiple non-benchmark issues by pressing the associated issue key on the keyboard, such as keyboard 300, that is mapped to the selected non-benchmark issue. For example, the trader may direct the trading application focus and display trading information on non-benchmark issue 2.1 in response to the trader pressing the issue 2.1 key on the keyboard. The issue 2.1 key is mapped to non-benchmark issue 2.1.

Figure 7:
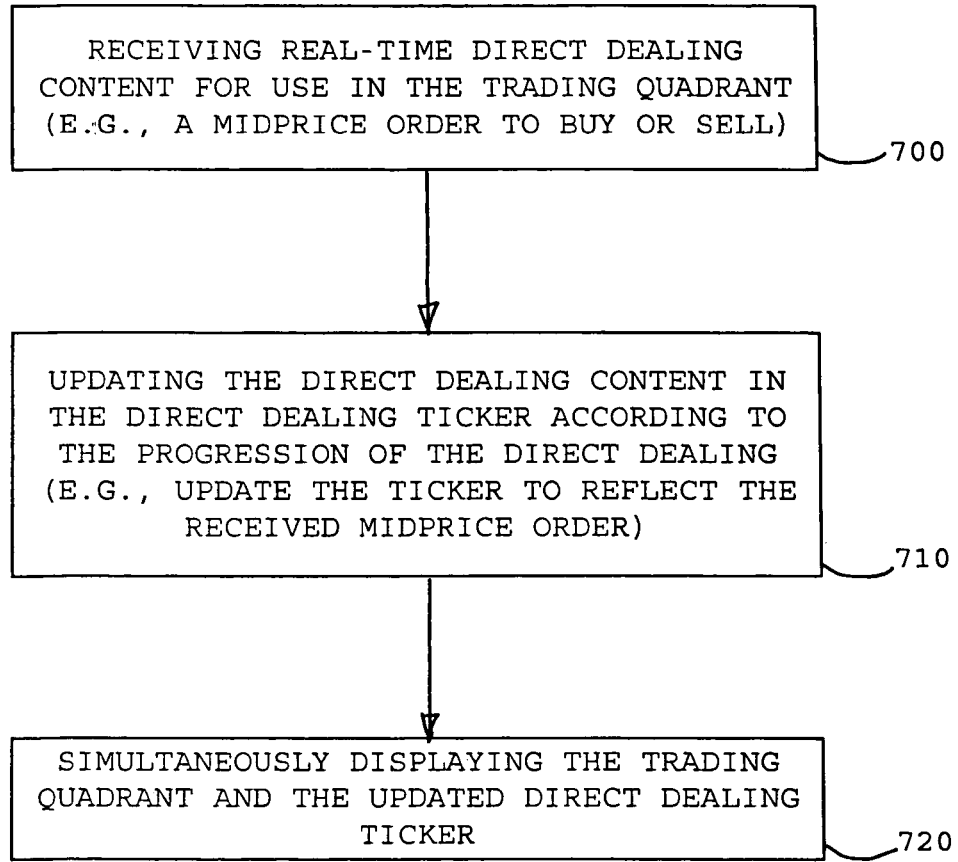
FIG. 7 is a flow diagram of a process that may be used to provide traders with updated direct dealing content in accordance with certain embodiments of the present invention.

FIG. 7 is a flow chart of an illustrative method involved in providing a trader with real-time direct dealing information in accordance with some embodiments of the present invention. This is a generalized flow chart. It will be understood that the steps shown in FIG. 7 may be performed in any suitable order, some may be deleted, and others added.

At step 700, the trading application may also provide the trader with direct dealing functionality. The trading application may receive direct dealing content for use in the trading quadrant. For example, a trader can submit a midprice direct dealing order, thereby making a bid/offer at the midprice. Once the order is entered, the trading application may display the start price (i.e., the midprice of the spread at the time the midprice direct dealing order was entered). At step 710, in response to receiving the direct dealing order, the trading application may update the direct dealing content in the direct dealing ticker to indicate to other traders that a midprice direct dealing order has been submitted. Other traders may submit responses to the midprice request. That is, traders may respond by submitting a buy or sell command with a particular size. Note that any number of traders may respond and the time at which the traders respond determines when the response will be matched, if it is matched at all.

At step 720, the trading application may simultaneously display the trading quadrant and the updated direct dealing ticker. In response to receiving responses and matching requests with responses, the trading application continuously updates the direct dealing content in the direct dealing ticker, thereby providing traders with a real-time progression of the direct dealing.

Thus, systems and methods for providing a trading interface with advanced features are provided. Persons skilled in the art will appreciate that the present invention can be practiced by other than the described embodiments, which are presented for purposes of illustration and not of limitation, and that the present invention is limited only by the claims which follow.

What is claimed is:

1. An apparatus comprising:
    a display device that simultaneously displays a plurality of quadrants in a single viewing region, in which each quadrant displays a benchmark issue and a plurality of non-benchmark issues related to the benchmark issue;
    a keyboard that comprises:
        (1) a first plurality of keys, in which a first key of the first plurality of keys corresponds to a first benchmark issue and a second key of the first plurality of keys corresponds to a second benchmark issue;
        (2) a second plurality of keys, in which each key of the second plurality of keys corresponds to an order for a non-benchmark issue; and
    a computing device that is coupled to the display device, the keyboard and a non-transitory machine readable medium, in which the non-transitory machine readable medium stores instructions which, when executed by the computing device, direct the computing device to:
    in response to the first key being pressed:
        (1) select a first quadrant of the plurality of simultaneously displayed quadrants, in which the first quadrant displays the first benchmark issue;
        (2) map the second plurality of keys such that each key of the second plurality of keys corresponds to a non-benchmark issue that is related to the first benchmark issue; and
        (3) place an order for the non-benchmark issue in response to one of the second plurality of keys being pressed after the first key being pressed;
    in response to the second key being pressed after the first key was pressed:
        (1) switch, from the first quadrant, to select a second quadrant of the plurality of simultaneously displayed quadrant, in which the second quadrant displays the second benchmark issue; and
        (2) re-map the second plurality of keys such that each key of the second plurality of keys corresponds to a non-benchmark issue related to the second benchmark issue that is displayed in the second quadrant.

2. The apparatus of claim 1, in which the keyboard comprises: a price improvement key, and in which the computing device is directed to:
    improve a market price for the selected non-benchmark issue and places the order with the improved market price in advance of other orders in a trading stack in response to the price improvement key being pressed.

3. The apparatus of claim 1, in which the keyboard comprises:
    a key that provides direct dealing functionality.

4. The apparatus of claim 1, in which the computing device is further directed to:
    direct the display device to display information for each of the non-benchmark issue in the selected first quadrant.

5. The apparatus of claim 4, in which the selected first quadrant includes a Treasury swaps trading quadrant.

6. The apparatus of claim 5, in which the Treasure swaps trading quadrant includes at least three of the most recent benchmark issues.

7. The apparatus of claim 4, in which the selected first quadrant includes an off-the-run trading quadrant.

8. The apparatus of claim 4, in which the selected first quadrant includes a yield curve trading quadrant.

9. The apparatus of claim 4, in which the selected first quadrant includes a basis trading quadrant.

10. The apparatus of claim 4, in which the selected first quadrant is includes a limit orders trading quadrant.

11. The apparatus of claim 1, in which the computing device is further directed to:
    receive real-time direct dealing content related to at least one non-benchmark issue and trading information related to the at least one non-benchmark issue, in which the direct dealing content comprises at least one of:

a request for a quote,
a response with a price,
a cancel to a response,
an amendment to a response, and
an acceptance of a response, and
in which the trading information comprises limit order data for the non-benchmark issue.

12. The apparatus of claim 11, in which the computing device is further directed to:
simultaneously display in the first quadrant:
the trading information related to the non-benchmark issue; and
a ticker that displays the received real-time direct dealing content related to the non-benchmark issue.

13. The apparatus of claim 12, in which the computing device is further directed to:
receive a midprice order to buy or sell the non-benchmark issue at a price within a spread market; and
update the displayed direct dealing content in the ticker to include the midprice order to buy or sell the non-benchmark issue.

14. The apparatus of claim 12, in which the ticker includes at least one request that includes an orientation and a size.

15. The apparatus of claim 12, in which the ticker includes at least one response that includes an orientation and a size.

16. The apparatus of claim 1, in which the keyboard further comprises a direct dealing key; and in which the computing device is further directed to: in response to the direct dealing key being pressed before the second key and after the first key, transmitting a request for a submission of orders for the non-benchmark issue at a midpoint price of a current spread for orders of the non-benchmark issue; and receiving at least one order in response to the request, and directing the display device to display the at least one order.

17. The apparatus of claim 16, in which displaying the at least one order includes displaying a plurality of orders through a ticker in the first quadrant in response to the orders being placed.

18. The apparatus of claim 1, in which the keyboard further comprises a price improvement key; and in which the computing device is further directed to: in response to the price improvement key being pressed before the second key and after the first key, placing the order having a price that places the order at a front of an order stack of orders for the non-benchmark issue.

19. An method comprising:
simultaneously displaying via a display device a plurality of quadrants in a single viewing region, in which each quadrant displays a benchmark issue and a plurality of non-benchmark issues related to the benchmark issue;
in response to a first key being pressed, selecting, via a processor, a first quadrant of the plurality of simultaneously displayed quadrants, in which the first quadrant displays a first benchmark issue;
in response to the first key being pressed, mapping via the processor a plurality of keys such that each key corresponds to a non-benchmark issue related to the first benchmark issue;
using the processor, placing an order for the non-benchmark issue in response to one of the plurality of keys being pressed after the first key was pressed;
in response to a second key being pressed after the first key was pressed:
switching, via the processor, from the first quadrant to a second quadrant of the plurality of simultaneously displayed quadrant, in which the second quadrant displays a second benchmark issue; and
re-mapping, via the processor, the plurality of keys such that each key corresponds to a non-benchmark issue related to the second benchmark issue that is displayed in the second quadrant.

20. The method of claim 19 further comprising:
receiving an indication that a price improvement key of the keyboard has been pressed, in which the price improvement key corresponds to improving a market price for the selected non-benchmark issue; and
in response to receiving the indication, placing the order with the improved market price in advance of other orders in a trading stack.

21. The method of claim 19 further comprising: providing direct dealing functionality.

22. The method of claim 19 further comprising: displaying information for each of the non-benchmark issue in the selected first quadrant.

23. The method of claim 22, in which the selected first quadrant includes a Treasury swaps trading quadrant.

24. The method of claim 23, in which the Treasure swaps trading quadrant includes at least three of the most recent benchmark issues.

25. The method of claim 22, in which the selected first quadrant includes an off-the-run trading quadrant.

26. The method of claim 22, in which the selected first quadrant includes a yield curve trading quadrant.

27. The method of claim 22, in which the selected first quadrant includes a basis trading quadrant.

28. The method of claim 22, in which the selected first quadrant includes a limit orders trading quadrant.

29. The method of claim 19 further comprising:
receiving real-time direct dealing content related to the non-benchmark issue and trading information related to the non-benchmark issue, in which the direct dealing content comprises at least one of:
a request for a quote,
a response with a price,
a cancel to a response,
an amendment a response, and
an acceptance of a response, and
in which the trading information comprises limit order data for the non-benchmark issue.

30. The method of claim 29 further comprising simultaneously displaying in the first quadrant: the trading information related to the non-benchmark issue; and
a ticker that displays the received real-time direct dealing content related to the non-benchmark issue.

31. The method of claim 30 further comprising: receiving a midprice order to buy or sell the non-benchmark issue at a price within a spread market; and
updating the displayed direct dealing content in the ticker to include the midprice order to buy or sell the non-benchmark issue.

32. The method of claim 30, in which the ticker includes at least one request that includes an orientation and a size.

33. The method of claim 30, in which the ticker includes at least one response that includes an orientation and a size.

34. The method of claim 19, further comprising: in response to a direct dealing key being pressed before the second key and after the first key, transmitting a request for a submission of orders for the non-benchmark issue at a midpoint price of a current spread for orders of the non-benchmark issue; and receiving at least one order in response to the request, and directing the display device to display the at least one order.

35. The method of claim 34, in which displaying the at least one order includes displaying a plurality of orders through a ticker in the first quadrant in response to the orders being placed.

36. The method of claim 19, further comprising: in response to a price improvement key being pressed before the second key and after the first key, placing the order having a price that places the order at a front of an order stack of orders for the non-benchmark issue.

* * * * *